United States Patent [19]

Wideman et al.

[11] Patent Number: 4,515,713
[45] Date of Patent: May 7, 1985

[54] DECARBOXYLATION OF ROSIN ACIDS

[75] Inventors: Lawson G. Wideman, Tallmadge; Joseph A. Kuczkowski, Munroe Falls, both of Ohio

[73] Assignee: The Goodyear Tire & Rubber Company, Akron, Ohio

[21] Appl. No.: 568,965

[22] Filed: Jan. 6, 1984

[51] Int. Cl.$^3$ .......................... C09F 1/00; C09F 5/00
[52] U.S. Cl. ..................... 260/106; 260/98; 106/311
[58] Field of Search ..................... 260/106; 106/311

[56] References Cited

U.S. PATENT DOCUMENTS

| | | | |
|---|---|---|---|
| 2,311,508 | 2/1943 | Aver | 260/98 |
| 2,431,788 | 12/1947 | Collonges et al. | 260/106 |
| 3,377,334 | 4/1968 | McBride et al. | 260/98 |
| 3,872,073 | 3/1975 | Thorpe et al. | 260/106 |
| 4,271,066 | 6/1981 | Matsuo et al. | 260/106 |

OTHER PUBLICATIONS

Webster's New World Dictionary, College Edition, World Publishing Co., (N.Y.), 1964, excerpt from p. 1664.

*Primary Examiner*—Herbert S. Cockeram
*Attorney, Agent, or Firm*—D. O. Nickey

[57] ABSTRACT

There is disclosed a process for the preparation of thermal oils which comprises heating rosin acids to a temperature from 300°–360° C. in the presence of at least one decarboxylation accelerator selected from the group consisting of high sulfur content tall oil rosin, Vinsol TM resin, fatty acids, organic sulfides and inorganic sulfides. The process of this invention provides an economical and efficient method of treating a renewable natural wood-derived feedstock to produce a material that is suited for numerous applications, especially in rubber formulations.

10 Claims, No Drawings

DECARBOXYLATION OF ROSIN ACIDS

TECHNICAL FIELD

The present invention relates to the preparation of "thermal oils" which can be used as extender oils for polymers. More particularly, it relates to a method for the decarboxylation of rosin acids to produce a material that has utility as replacement for processing or extender oils that are conventionally used in rubber formulations.

It has been discovered that the rate of decarboxylation of rosin acids can be accelerated with various compounds which remain in the thermal oil and which are compatible with rubber polymers.

BACKGROUND ART

Rosin is a solid resinous material that occurs naturally in pine trees. There are three major sources of rosin, (1) gum rosin is from the oleoresin extrudate of the living pine tree, (2) wood rosin from the oleoresin contained in the aged stumps; and (3) tall oil rosin from the waste liquor recovered as a by-product in the Kraft paper industry.

Rosin or colophony is the residue left after removing the volatile oils from crude oil of turpentine by steam distillation. It is composed mainly of abietic acid which is a very brittle solid that breaks with a glassy fracture.

The aged virgin pine stump is the source of wood rosin. The stump is allowed to remain in the ground for about ten years so that its bark and sapwood may decay and slough off to leave the heartwood rich in resin. Hercules Inc., of Wilmington, Del., has found that production of pine stump wood rosin can be artifically stimulated by injecting the herbicide, paraquat, into the lower portion of a living tree. This treatment of the stump produces Pinex TM rosin. The conversion of Pinex TM and also tall oil rosin into replacements for petroleum based extender oils is a portion of the instant invention.

Rosins derived from both oleorosin and aged stump wood are composed of approximately 90 percent resin acids and 10 percent nonacidic components. Rosin acids are monocarboxylic acids having the typical molecular formula, $C_{20}H_{30}O_2$. Over the years, nomenclature of individual acids has changed. In addition to trivial names, such as abietic, levopimaric, etc. three different numbering systems have been used. IUPAC nomenclature names rosin acids as derivatives of abietane. The following is a structural formula for abietic acid:

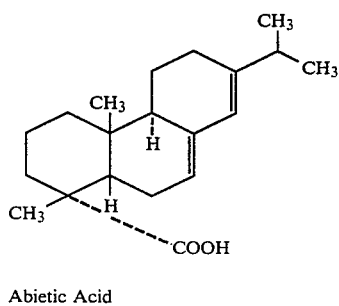

Abietic Acid wherein the spacial relationship of substituents on asymmetric carbon atoms are designated as α or β to denote whether the substituents are above or below the plane of the paper. For example, α-methyl denotes the methyl group as below the plane and is represented by a dotted line, while β-methyl would be above the plane and is represented by a solid line.

Rosin acids combine to form resin acids which are characterized by high molecular weight, usually a variation in the weights of the rosin acid molecules which comprise it, and a gummy or tacky consistency at certain temperatures. The resins described herein are not the synthetic resins known to the art of polymer chemistry.

The resin acid molecule possesses two chemically reactive centers, the double bonds and the carboxyl group. Through these, many modifications in structure and numerous derivatives are obtainable. Because resin is composed of a number of rosin acids, the chemistry of its reactions is relatively complex.

In addition to the double bond reactions, rosin acids also undergo typical carboxyl group reactions. Salts and esters of rosin are important commercial derivatives of rosin. Other reactions involve the reduction of the carboxyl group to the alcohol and the conversion of the carboxyl group to the nitrile.

The structurally hindered nature of the rosin acid carboxyl group makes it necessary to use high temperatures or generally drastic conditions to bring about decarboxylation and usually, complete aromatization, which unfortunately produces highmelting white solids.

Various types of rosin acids have been used as extenders for high molecular weight SBR. *Properties of GR-S Extended With Rosin Type Acids,* L. H. Howland, J. A. Reynolds, and R. L. Provost, Industrial and Engineering Chemistry, Vol. 45, No. 5, May 1953. Also included in these initial studies were several nonrosin acids which included tallow fatty acid, oleic acid and naphthenic acid. Reasonably good cured physical properties can be obtained with the rosin type acids, whereas relatively poor physical properties are obtained with the nonrosin acids. Problems associated with the use of rosin acids are cure retardation, high tack and poor low temperature performance, which limit their use as an extender in rubber formulations.

U.S. Pat. No. 3,985,701 discloses an oil-containing rubber prepared by mixing a rubber selected from the group consisting of natural rubber, homopolymers of conjugated diolefins and copolymers of conjugated diolefins with ethylenically unsaturated monomers, with mineral oil having at least a 10 weight percent aromatic compound conten which is obtained through a specific chemical process.

U.S. Pat. No. 4,324,710 discloses the use of naturally occurring thermoplastic resins as substitutes for process oils. The resins are derived from crude wood rosin which have an acid number between 40 and 105.

U.S. Pat. No. 1,852,244 discloses a method of producing rosin oil (thermal oil) which consists of heating the rosin acids in the presence of a fuller's earth catalyst.

The use of heat as the sole means to decarboxylate wood rosins is very inefficient and energy intensive. The introduction of catalysts in the production of rosin oil or thermal oil has led to many improvements both with respect to reduced reaction time and improved quality. Known processes to decarboxylated wood rosins, such as U.S. Pat. No. 1,852,244, have the problem of catalyst residue in the thermal oil or rosin oil. When the thermal oil is intended for use in rubber, even minute amounts of foreign materials, such as catalyst residues, will have a deleterious effect on final product properties.

Rosin oils or thermal oils have been produced by decomposing rosin acids at high temperatures, and it has been known to produce a neutral rosin oil by the treatment of rosin with heat and hydriodic acid or iron turnings. In addition, the oil is sometimes distilled over alkali in order to free it entirely from rosin acids.

According to the concepts of the present invention, it has been unexpectedly found that naturally occurring rosin or resin acids can be economically and efficiently, partially or totally decarboxylated to yield a material that is suitable for use in rubber formulations. The prior art does not suggest or disclose the use of decarboxylation accelerators such as high sulfur content tall oil, Vinsol TM resin, fatty acids, organic sulfides and inorganic sulfides.

DISCLOSURE OF THE INVENTION

There is disclosed a process for the preparation of thermal oils which comprises heating naturally occurring resin or rosin acids to a temperature from 300°–360° C. in the presence of at least one decarboxylation accelerator selected from the group consisting of high sulfur content tall oil rosin, Vinsol TM resin, fatty acids, organic sulfides and inorganic sulfides.

Also disclosed is a process for the decarboxylation of wood rosin acids characterized in that the wood rosin acid is heated to a temperature of from 300°–450° C. for 2-24 hours in the presence of at least one decarboxylation accelerator selected from the group consisting of diphenyl sulfide, benzyl phenyl sulfide, ditolyl sulfide, dinaphthyl sulfide, sodium sulfide, potassium sulfide, lithium sulfide, diheptyl sulfide, magnesium sulfide, calcium sulfide, iron sulfide, stearic acid, oleic acid, linoleic acid, linolenic acid, palmitic acid, lauric acid, nonanoic acid and high sulfur content tall oil.

Unexpectedly, we found that the decarboxylation of rosin acids, resin acids or Pinex TM rosin is accelerated by the addition of tall oil rosin containing sulfur, thermoplastic resins such as Vinsol TM (a registered trademark of Hercules, Inc.) fatty acids, and by organic and inorganic sulfides.

As used herein, thermal oil or rosin oil means the fluid material that results from the decarboxylation of rosin acids, resin acids or Pinex TM rosin. These oils have a lower acid number than the starting materials and generally are viscous fluids. Representative of the wood rosin acids that can be decarboxylated using the instant process are abietic, levopimaric, neoabietic, palustric, dehydroabietic, dihydroabietic, tetrahydroabietic, pimaric, isopimaric, Δ-isopimaric, elliotinoic and sandaracopimaric.

The process of this invention provides a method for economically and efficiently producing oils that do not contain objectionable accelerator or catalyst residues. Those skilled in the art of rubber compounding will appreciate that catalyst residues, such as fuller'earth as described in U.S. Pat. No. 1,852,244, can have a detrimental effect upon the vulcanizates physical properties.

The temperature range of the instant process can range from 250°–450° C., preferably from 275°–375° C. and most preferably from 300°–360° C. The accelerators of the instant invention provide for acceptable decarboxylation within a reasonable amount of reaction time. The reaction time can vary from 2 to 24 hours, depending upon the acid number desired for the thermal oil and/or the use of a particular accelerator. Those skilled in this art will appreciate that the rate of drop in acid number of the thermal oil will decrease as the reaction proceeds, however, the accelerators of the present invention provide for a lower acid number thermal oil than a thermal oil prepared without accelerators given the same reaction conditions.

The thermoplastic resins which are useful in the present invention are dark materials derived from crude wood rosin. Crude wood rosin is the product remaining after a solvent extract of pine wood chips has been separated into recovered solvent, turpentine, pine oil, and other terpenes. The crude wood rosin is separated into a pale rosin and a resinous fraction containing the dark colored material. It is from this dark resinous material that an accelerator of the present invention is derived. A specific example of a thermoplastic resin is Vinsol TM, manufactured by Hercules Corporation, which has a softening point of approximately 100° C. to about 130° C. (Hercules drop method), and an acid number of about 95. The thermoplastic resins are soluble in most polar solvents but insoluble in water, aliphatic hydrocarbon solvents, fats and oils. The thermoplastic resins can be described as a complex mixture of high molecular weight phenolic compounds, resin acids, neutral materials, and several minor components. The acid number can generally range from about 40 to about 105, and preferably from about 90 to about 105, with the softening point ranging from about 110° C. to about 130° C. Its constituents include high molecular weight phenols, carboxyl-substituted phenols, substituted phenyl ethers, and polyphenols. It contains acidic materials derived from resin acids and oxidized resin acids. High molecular weight neutral compounds are present such as polymerized terpenes and natural waxes. Naturally, the material can vary from pine tree grove to pine grove, as well as from area of country to area of country, as well as from type of particular recovery process utilized, and the like.

It has also been discovered that tall oil rosin containing sulfur is a decarboxylation accelerator useful in the present invention. Tall oil (a sulfate naval store) is obtained as a by-product of the kraft (sulfate) pulping of conifer chips, primarily southern pine. The tall oil rosin used herein as a medium colored, high softening point resin. It typically has an acid number of 163 as determined by ASTM D803-65, a fatty acid content of 3.0% as determined by ASTM D1585-63 and a softening point of about 73° C., and a sulfur content of from 300–700 parts per million by weight.

It is required that the tall oil rosin contain at least 300 parts per million sulfur by weight to be useful in the instant process. If sulfur or fatty acid content is low or non-existent, the tall oil rosin decarboxylation can be accelerated through the use of an organic or inorganic sulfide or a fatty acid.

Representative organic sulfides useful in the instant invention are diphenyl sulfide, benzyl phenyl sulfide, ditolyl sulfide, dinaphthyl sulfide, diheptyl sulfide, diisoamyl sulfide and organic sulfides that have boiling points greater than 250° C.

Representative of the inorganic sulfides useful in the instant invention are sodium sulfide, potassium sulfide, lithium sulfide, magnesium sulfide, calcium sulfide, zinc sulfide, iron sulfide and inorganic sulfides of metals that are compatible with rubber and polymeric systems.

Representative of the fatty acids suitable for use in the present invention are stearic acid, oleic acid, linoleic acid, linolenic acid, palmitic acid, lauric acid, nonanoic acid and fatty acids that have boiling points greater than 250° C.

Experimental Preparation of Thermal Oil From Tall Rosin With No Added Accelerator A 1-liter 3-necked flask was equipped with a nitrogen inlet tube and thermometer. An air-cooled condenser was attached and the flask was charged with 454 g of crushed tall oil rosin (Westvaco Rosin S, having a sulfur content of between 300 and 700 ppm by weight). Heat was supplied by a heating mantle, and an off-gas line was attached to the air-cooled condenser. The reaction temperature was raised slowly at first to melt the rosin, and then more quickly. At about 270° C., the evolution of hydrogen and water was observed with appreciable spattering as a portion of the water continuously refluxes back into the hot liquid rosin. The temperature was raised to 350° C. and an overhead oil was observed to distill with the water. The evolution of gas ceased after 12 hours residence time. The reaction flask was heated for a total time of 16 hours. The amount of overhead oil was 25 g with 12 g of overhead water. The acid number for the overhead oil was determined to be 39. The acid number for the 16 hour thermal oil was found to be 11 and was very fluid. Using the same procedure, Pinex TM rosin decarboxylated much slower (Table I).

Using the same procedure as above, a comparison of the decarboxylation rates for Pinex TM rosin and tall oil rosin is set out in Table I wherein heat is the sole means of decarboxylation. The lower acid number indicates that more decarboxylation has occurred.

TABLE I (No Added Accelerator Controls)

| Oil | Comments | Acid Number | Gardner Viscosity Poise |
|---|---|---|---|
| Pinex TM Rosin | A solid, no heating | 163 | — |
| Tall Oil Rosin | A solid, no heating | 168 | — |
| Sample #1 | 12 hr at 350° C. - Pinex TM | 65 | 714.8 |
| Sample #2 | 24 hr at 350° C. - Pinex TM | 45 | 4.63–6.34 |
| Sample #3 | 36 hr at 350° C. - Pinex TM | 23 | 4.63 |
| Sample #4 | 16 hr at 350° C. - Tall Oil Rosin Sulfur Content 300 ppm by weight | 11 | 0.435 |

The use of a noble metal catalyst is known to aid the decarboxylation of abietic or dehydroabietic acid, which results in the complete aromatization of the phenanthrene structure to give retene which is a white solid and thus not useful as a processing oil. Decarboxylation is accompanied by dehydrogenation and demethanation.

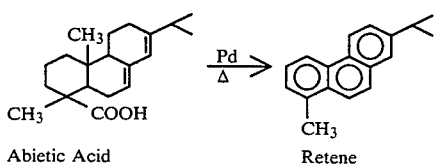

Abietic Acid        Retene

NMR analysis of retene shows a low ratio of aliphatic to aromatic protons, 10/8 (1.15/1), whereas dehydroabietic acid gives a ratio of 8/1. IR analysis of retene shows complete loss of carboxylic carbonyl.

Using the process of the instant invention, decarboxylation of abietic acid occurs at 350° C. and the phenanthrene structure is not aromatized beyond the C ring. Thus no demethanation occurs.

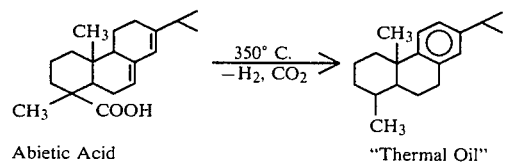

Abietic Acid        "Thermal Oil"

The thermal oil is shown by NMR analysis to have an aliphatic to aromatic proton ratio (8.3/1) very similar to abietic acid (8.0/1). IR analysis of the thermal oil shows that the carboxylic carbonyl slowly decreases with residence time at 350° C. Two very small carbonyl bands replace the strong carboxylic carbonyl as decarboxylation occurs. These two carbonyl bands suggest that a small amount of acid anhydride also forms in the system.

BEST MODE FOR CARRYING OUT THE INVENTION

Experimental I

Accelerated Pinex TM and Tall Oil Rosin Decarboxylation

A high sulfur content tall oil rosin (300–700 ppm sulfur by weight) from Westvaco was thermally treated at 350° C. and found to decarboxylate much faster than Pinex TM rosin (see Table I, Samples #3 and #4). Using the procedure described for the controls, tall oil rosin was mixed with the Pinex TM rosin in 1%, 10% and 50% amounts by weight of total rosin. The mixture was thermally treated at 350° C. The high sulfur content tall oil rosin was found unexpectedly to accelerate the decarboxylation of the Pinex TM rosin (Table II).

Pinex TM rosin decarboxylation was accelerated with an organic sulfide (di-phenyl sulfide, $\phi_2 S$) and an inorganic sulfide ($Na_2S$) in separate runs. The rate of decarboxylation was accelerated over that of Pinex TM rosin alone at 350° C. (Table II).

Oleic and stearic acids were also found to accelerate the decarboxylation of Pinex TM, see Samples 11–13, Table II. Thermoplastic resins (Vinsol resin) was also found to accelerate the decarboxylation of Pinex TM rosin (Table II).

TABLE II

| Sample | Comments, %'s by Weight | Acid Number | Gardner Viscosity Poise |
|---|---|---|---|
| #5 | 1% Tall Oil Rosin+ in Pinex TM, 24 hr. | 23 | 76.34 |
| #6 | 10% Tall Oil Rosin+ in Pinex TM, 24 hr. | 23 | 76.34 |
| #7 | 50% Tall Oil Rosin+ in Pinex TM, 24 hr. | 8 | 0.884–1.07 |
| #8 | 1% $Na_2S$ in Pinex TM, 24 hr. | 13 | 714.8 |
| #9 | 1% $\phi_2 S$ in Pinex TM, 24 hr. | 24 | 6.34–9.85 |
| #10 | 1% oleic acid in Pinex TM, 24 hr. | 24 | 714.8 |
| #11 | 1% stearic acid in Pinex TM, 24 hr. | 27 | 714.8 |
| #12 | 3% stearic acid in Pinex TM, 24 hr. | 15 | 2.7 |
| #13* | 10% stearic acid in Pinex TM, 24 hr. | 24 | 4.63–6.34 |
| #14 | 17% Vinsol in Pinex TM, 9 hr. | | 20 |
| #15 | 17% Vinsol in Pinex TM, 24 hr. | 6 | — |

*The acid number of 24 reflects an excess of stearic acid in the resulting thermal oil.
+Tall oil rosin containg 300–700 ppm sulfur by weight.

Experimental II

Using the apparatus and procedure previously described, mixtures of Tall Oil and Pinex TM were decarboxylated using low temperature (280°–320°) and/or short residence time. Also Pinex TM was decarboxylated with Na$_2$S as the accelerator. Table III sets out the results.

TABLE III

Decarboxylation of Pinex TM with Accelerator

| Sample | Comments, %'s by Weight | Reaction temp. °C. | Residence Time (hr) | Acid Number |
|---|---|---|---|---|
| #16 | 50% Tall Oil Rosin in Pinex TM | 280 | 3 | 139 |
| #17 | 59% Tall Oil Rosin in Pinex TM | 320 | 3 | 111 |
| #18 | 1% Na$_2$S in Pinex TM | 280 | 3 | 115 |
| #19 | 1% Na$_2$S in Pinex TM | 280 | 9 | 104 |
| #20 | 1% Na$_2$S in Pinex TM | 280 | 12 | 99 |

+Tall oil rosin containing 300–700 ppm sulfur by weight.

Experimental III

Table IV sets out the rate of decarboxylation as a function of residence time at 350° C. The data demonstrates that Tall Oil and stearic acid can accelerate the decarboxylation of Pinex TM.

TABLE IV

Rate of Decarboxylation as a Function of Residence Time at 350° C.

| Sample | Comments, %'s by Weight | 0 hr. | 3 hr. | 9 hr. | 12 hr. | 16 hr. | 24 hr. |
|---|---|---|---|---|---|---|---|
| #21 | Pinex TM Rosin | 163 | 93 | 65 | 60 | — | 45 |
| #22 | Tall Oil Rosin | 168 | 61 | — | 17 | 11 | — |
| #23 | 50% Tall Oil and Pinex TM | 163 | 79 | 42 | 27 | 17 | 8 |
| #24 | 3% Stearic Acid and Pinex TM | 163 | 75 | 47 | 39 | — | 15 |

+Tall oil containing 300–700 ppm sulfur by weight.

From the data in Table III and IV, it is evident that a reaction temperature of 300° C. or less would not provide an economical method to produce the oil on a commercial scale.

Experimental IV

Preparation and Use of a Thermal Oil in a Rubber Formulartion

Using the process of the instant invention several thermal oils were prepared and incorporated into a rubber formulation.

Thermal oil A is a control that was prepared by placing 2.0 kg of wood rosin in a glass reactor and heated to 350° C. under nitrogen for 24 hours. The resulting thermal oil weighed 1.73 kg and had an acid number as determined by ASTM D-465 of 45.

Thermal oil B was prepared by placing 0.045 kg of tall oil rosin (300–700 ppm sulfur content by weight) and 0.41 kg of Pinex TM in a glass reactor and heated to 350° C. under nitrogen for 24 hours. The resulting oil weighed 0.39 kg and had an acid number of 23.

Thermal oil C was prepared by placing 0.45 kg of Pinex TM wood rosin and 0.0045 kg of sodium sulfide in a glass reactor. The contents were heated to 350° C. under nitrogen and held there for 24 hours. The resulting oil weighed 0.36 kg and had an acid number of 13.

Thermal oil D was prepared by placing 0.23 kg of Pinex TM wood rosin and 0.23 kg of tall oil rosin (300–700 ppm sulfur) into a glass reactor and heated to 350° C. for 24 hours under nitrogen. The resulting oil weighed 0.395 kg and had an acid number of 8.

A rubber composition containing the materials set out below was prepared in a BR Banbury using two separate passes for three minutes at 70 RPM.

| Material | Wt Parts |
|---|---|
| SBR* | 70 |
| Polybutadiene** | 30 |
| GPT Carbon Black | 70 |
| Extender | 35 |

*Acid/Alum coagulated latex of SBR 1712 containing 1.25 phr Wingstay 29 TM (p-oriented styrenated diphenylamine) as a stabilizer.
**Budene 1207 TM The Goodyear Tire & Rubber Company.

The sulfur and accelerator were added to the compound in a third Banbury mix for 3 minutes at 40 RPM. The SBR latex was obtained from a commercial facility and coagulated to a dry crumb without the normal addition of aromatic processing oil. The controls and thermal oil additions were made directly to the Banbury during the nonproductive mixing stage.

The cure behavior and vulcanizate properties of the 70/30 SBR/PBD tread formulation which contains controls and thermal oil as extending oil are compared in Table V. The controls are a commercially accepted extender oil compound #1 and thermal oil A, compound #2.

TABLE V

CURE BEHAVIOR AND VULCANIZATE PROPERTIES

| Compound Extender | Controls | | | | |
|---|---|---|---|---|---|
| | #1 Aromatic | #2 | #3 | #4 | #5 |
| | | Thermal Oil | | | |
| | Oil | A | B | C | D |
| Acid No | 4 | 45 | 23 | 13 | 8 |
| ML/4 @ 100° C. | 58 | 66 | 61 | 58 | 58 |
| Rheometer Max Torque | 61 | 57 | 55 | 55 | 56 |
| 300° F. Min Torque | 12 | 14 | 12 | 11 | 12 |
| Δ Torque | 49 | 43 | 43 | 44 | 44 |
| T$_{90}$ | 17 | 23 | 23 | 23 | 21 |
| T$_2$ | 6.5 | 6 | 7.0 | 7.5 | 7.0 |
| Stress TS, MPa | 17.7 | 17.3 | 16.7 | 15.1 | 16.6 |
| Strain EB, % | 430 | 500 | 530 | 490 | 490 |
| Shore A | 67 | 67 | 67 | 67 | 66 |

The data in Table V demonstrates that thermal oils prepared according to the instant invention are comparable to a commercially accepted aromatic extending oil and the oil prepared without an accelerator.

According to the procedure described above, aromatic oil and "thermal oils" C and D were added to a 70/30 SBR/PBD tread formulation. The original and aged properties are compared in Table VI.

TABLE VI

ORIGINAL AND AGED VULCANIZATE PROPERTIES

| Compound | | #6 | #3 | #4 | #5 |
|---|---|---|---|---|---|
| Extender | | Aromatic Oil | "Thermal Oil" | | |
| | | | B | C | D |
| Acid No | | 4 | 23 | 13 | 8 |
| ML/4 @ 100° C. | | 56 | 61 | 58 | 58 |
| Rheometer 149° C. | Max Torque | 56 | 55 | 55 | 56 |
| | Min Torque | 11 | 12 | 11 | 12 |
| | Δ Torque | 45 | 43 | 44 | 44 |
| | $T_{90}$ | 18 | 23 | 23 | 21 |
| | $T_2$ | 7.5 | 7.0 | 7.5 | 7.0 |
| Stress Strain Original | TS, MPa | 15.7 | 16.7 | 15.1 | 16.6 |
| | EB, % | 460 | 530 | 490 | 490 |
| | $M_{200}$, MPa | 4.8 | 4.1 | 4.2 | 4.5 |
| | Shore A | 66 | 67 | 67 | 66 |
| Stress Strain Aged 3 days Air oven, 100° C. | TS, MPa | 12.2 | 14.3 | 13.5 | 14.0 |
| | EB, % | 270 | 280 | 270 | 250 |
| | $M_{200}$, MPa | 8.8 | 10.1 | 10.0 | 11.7 |
| | Shore | 74 | 81 | 80 | 81 |
| Stress Strain Aged 5 days $N_2$ bomb, 122° C. | TS, MPa | 13.1 | 14.6 | 12.9 | 14.4 |
| | EB, % | 350 | 390 | 350 | 360 |
| | $M_{200}$, MPa | 5.7 | 5.8 | 5.9 | 6.3 |
| | Shore A | 67 | 70 | 69 | 71 |
| Rebound | Cold, % | 53.9 | 50.6 | 53.4 | 54.5 |
| | Hot, % | 69.6 | 65.7 | 67.4 | 69.0 |
| ORIGINAL | | | | | |
| Dynamic Properties 100° C. | Modulus, kg/cm² | 72.1 | 75.2 | 71.2 | 71.0 |
| | Resilience, % | 39.3 | 36.2 | 38.1 | 39.0 |
| | Int. Visc, Kp | 28.4 | 32.3 | 29.0 | 28.2 |
| | Hx | 112.4 | 123.4 | 113.3 | 111.3 |
| | Hf | 96.8 | 97.6 | 100.1 | 98.8 |
| AGED | | | | | |
| Dynamic Properties 100° C. Aged 3 days Air oven 100° C. | Modulus, kg/cm² | 85.2 | 116.4 | 116.9 | 127.4 |
| | Resilience, % | 41.5 | 36.3 | 37.7 | 38.0 |
| | Int. Visc, pa.S | 60.0 | 49.7 | 48.1 | 52.0 |
| | Hx | 128.0 | 190.4 | 187.1 | 202.3 |
| | Hf | 79.0 | 62.9 | 61.3 | 55.9 |
| Dynamic Properties 100° C. Aged 5 days $N_2$ bomb at 122° C. | Modulus, kg/cm² | 65.6 | 94.1 | 96.7 | 92.9 |
| | Resilience, % | 42.0 | 37.2 | 39.7 | 37.4 |
| | Int. Visc, Kp | 24.0 | 39.3 | 37.7 | 38.5 |
| | Hx | 97.8 | 151.8 | 149.7 | 149.4 |
| | Hf | 101.6 | 76.7 | 71.7 | 77.5 |

The cure behavior of the aromatic oil control (Compound #6) and the experimental samples containing "thermal oil" (Compound Nos. 3, 4 and 5) compare favorably except for a slight longer time to reach 90% of cure ($T_{90}$). The original stress-strain properties and the nitrogen aged stress-strain properties show little difference between the control and experimental, whereas the air oven aged samples show higher tensile strength and 200% modulus for the experimental samples.

The original dynamic properties for the control and experimental samples compare favorably, except that the dynamic resilience of the experimental samples show a decrease as the acid number is lowered from 23 to 8. The aged dynamic properties show higher dynamic modulus and lower dynamic resilience for the experimental samples when compared to the control.

INDUSTRIAL APPLICABILITY

The instant invention provides accelerators for the decarboxylation of rosin acids to produce thermal oils. The present invention provides an efficient and economical means of producing, extending or processing oils from renewable hydrocarbon feed stocks which do not have residues that deleteriously affect their use in rubber formulations.

While certain representative embodiments and details have been shown for the purpose of illustrating the invention, it will be apparent to those skilled in this art that various changes and modifications may be made therein without departing from the scope of the invention.

What is claimed is:

1. An extender oil for rubber prepared by decarboxylating wood rosin acids by heating at temperatures from 300° C. to 450° C. in the presence of high sulfur tall oil rosin, dark thermoplastic resins derived from crude wood rosin, fatty acids, and organic and inorganic sulfides to accelerate the decarboxylation.

2. An extender oil of claim 1 prepared in the presence of 1 to 100% high sulfur tall oil rosin by weight.

3. An extender oil of claim 1 prepared in the presence of 1 to 10% fatty acids by weight.

4. An extender oil of claim 1 prepared in the presence of 1 to 5% sulfide by weight.

5. An extender oil of claim 1 prepared in the presence of 1 to 20% dark thermoplastic resins derived from crude wood rosin by weight.

6. An extender oil of claim 1 having an acid number below 30.

7. An extender oil of claim 1 prepared by heating from 12 to 24 hours.

8. An extender oil of claim 1 prepared by heating at a temperature of 350° C. to 360° C.

9. A process for the decarboxylation of wood rosin acids characterized in that the wood rosin acid is heated to a temperature of from 300° C. to 450° C. for 2 to 24 hours in the presence of at least one decarboxylation accelerator selected from the group consisting of diphenyl sulfide, benzyl phenyl sulfide, ditolyl sulfide, dinaphthyl sulfide, sodium sulfide, potassium sulfide, lithium sulfide, diheptyl sulfide, magnesium sulfide, calcium sulfide, iron sulfide, stearic acid, oleic acid, linoleic acid, linolenic acid, palmitic acid, lauric acid, nonanoic acid and high sulfur content tall oil.

10. A process for the decarboxylation of wood rosin acids characterized in that the wood rosin acid is heated to a temperature of from 350° C. to 360° C. for a sufficient period of time in the presence of at least one decarboxylation accelerator selected from the group consisting of diphenyl sulfide, benzyl phenyl sulfide, ditolyl sulfide, dinaphthyl sulfide, sodium sulfide, potassium sulfide, lithium sulfide, diheptyl sulfide, magnesium sulfide, calcium sulfide, iron sulfide, stearic acid, oleic acid, linoleic acid, linolenic acid, palmitic acid, lauric acid, nonanoic acid, dark thermoplastic resins derived from crude wood rosin, and high sulfur content tall oil to yield an extender oil for rubbers with an acid number of less than 30.

* * * * *